United States Patent [19]

Ito et al.

[11] Patent Number: 5,914,380
[45] Date of Patent: Jun. 22, 1999

[54] TONER RESIN AND PROCESS FOR ITS PRODUCTION

[75] Inventors: Hirokazu Ito; Hitoshi Iwasaki; Noriyuki Tajiri, all of Toyohashi, Japan

[73] Assignee: Mitsubishi Rayon Company Ltd., Tokyo, Japan

[21] Appl. No.: 08/887,273

[22] Filed: Jul. 2, 1997

Related U.S. Application Data

[63] Continuation of application No. 08/569,138, filed as application No. PCT/JP95/00784, Apr. 20, 1995, abandoned.

[30] Foreign Application Priority Data

May 10, 1994 [JP] Japan ................................ 6-119667
May 10, 1994 [JP] Japan ................................ 6-119668

[51] Int. Cl.$^6$ .................................................. C08F 20/06
[52] U.S. Cl. ................................ 526/318.6; 526/323.1; 526/323.2
[58] Field of Search ................................ 526/323.1, 323.2, 526/318.6

[56] References Cited

U.S. PATENT DOCUMENTS

| | | |
|---|---|---|
| 3,644,307 | 2/1972 | Biale . |
| 4,110,527 | 8/1978 | Chesler et al. . |
| 4,966,829 | 10/1990 | Yasuda et al. . |
| 5,066,727 | 11/1991 | Aizawa et al. . |
| 5,180,649 | 1/1993 | Kukimoto et al. . |
| 5,266,434 | 11/1993 | Hirayama et al. . |
| 5,268,248 | 12/1993 | Tanikawa et al. . |
| 5,338,638 | 8/1994 | Tsuchiya et al. . |

FOREIGN PATENT DOCUMENTS

| | | |
|---|---|---|
| 0 331 393 | 9/1989 | European Pat. Off. . |
| 0 410 457 | 1/1991 | European Pat. Off. . |
| 0 410 482 | 1/1991 | European Pat. Off. . |
| 0 417 812 | 3/1991 | European Pat. Off. . |
| 0 618 511 | 10/1994 | European Pat. Off. . |

OTHER PUBLICATIONS

Patent Abstracts of Japan, vol. 15, No. 322 (P–1239), Aug. 16, 1991, JP 03 118553, May 21, 1991.
Patent Abstracts of Japan, vol. 13, No. 533 (P–967), Nov. 28, 1989, JP 01 219765, Sep. 1, 1989.
Patent Abstracts of Japan, vol. 13, No. 180 (P–864), Apr. 27, 1989, JP 64–010262, Jan. 13, 1989.

*Primary Examiner*—Bernard Lipman
*Assistant Examiner*—N. Sarofim
*Attorney, Agent, or Firm*—Oblon, Spivak, McClelland, Maier & Neustadt, P.C.

[57] ABSTRACT

Toner resin consisting of a polymer which comprises (a) an aromatic vinyl unit, (b) an acrylic or methacrylic compound unit and (c) a polyfunctional compound unit, and which has a tetrahydrofuran insoluble content of 5–60%, a maximum peak molecular weight of no more than 20,000 in the molecular weight distribution of the tetrahydrofuran soluble portion as measured by gel permeation chromatography, and a weight average polymerization degree of no more than 180, as well as a process for its production. The resulting toner resin has an excellent fixing property, non-offsetting property, blocking resistance and image stability.

18 Claims, No Drawings

TONER RESIN AND PROCESS FOR ITS PRODUCTION

This is a continuation of application Ser. No. 08/569,138 filed on Jan. 11, 1996, abandoned, which was filed as International Application No. PCT/JP95/00784 on Apr. 20, 1995.

TECHNICAL FIELD

The present invention relates to a resin which has a useful application in dry toners for printers, copying machines, facsimiles and the like which work by electrophotography or electrostatic printing, as well as to a process for its production. The present invention specifically relates to a toner resin with an excellent fixing property, a non-offsetting property, blocking resistance and image stability, and to a process for its production.

BACKGROUND ART

The increasing printing speeds of copying machines, printers and the like each year are demanding corresponding improvements in toners and binder resins as well. For example, the toner and carrier must be violently agitated together to match the printing speed when electrostatic charges are generated the developing process, while lower fixing temperatures are also being used for the fixing process. In other words, with lower fixing temperatures there are required toners and toner resins with improved low-temperature fixing properties, improved electrostatic stability for more stable images, and improved blocking resistance so that the toner does not cake during storage.

In order to lower the fixing temperature and improve the fixing properties, it is necessary to reduce the molecular weight of the resin. Lower molecular weights, however, have led to problems of poor non-offsetting properties, as well as additional problems including lower glass transition temperatures and poor blocking resistance of the resins.

In the case of styrene/acrylic acid or methacrylic acid ester-based resins, reduction in the molecular weight necessitates a higher polymerization temperature during the production process, and when it is attempted to obtain the resin by suspension polymerization, a higher polymerization temperature causes the polymer to rise to the surface of the reaction solution due to the reaction pressure, generating what is known as a floating polymer, and producing a secondary cohesion polymer. Consequently, methods which use large amounts of a dispersant are employed to prevent the production of such secondary cohesion, but in such cases the large amount of dispersant used results in the problem of inferior image stability of the toner, while a large amount of the dispersant also adheres to the surface of the polymer which has undergone secondary cohesion, thus complicating its cleaning and removal, and also adding to the problem of inferior image stability.

DISCLOSURE OF THE INVENTION

The present invention has been accomplished in order to overcome the above-mentioned drawbacks, and its purpose is to provide a toner resin suitable for obtaining toner with an excellent fixing property, a non-offsetting property, blocking resistance and image stability, and to a process for its production.

As a result of continued diligent research, the present inventors have found that the aforementioned object may be achieved by using a toner resin consisting of a polymer with specific properties, which contains an aromatic vinyl unit, an acrylic or methacrylic compound (for simplicity's sake, these will hereunder be referred to collectively as a "(meth) acrylic compound") unit and a polyfunctional compound unit as the polymerization components, and the present invention has been completed on the basis of this finding.

In other words, the present invention provides a toner resin consisting of a polymer which comprises (a) an aromatic vinyl unit, (b) a (meth)acrylic compound unit and (c) a polyfunctional compound unit, and which has a tetrahydrofuran (hereunder, THF) insoluble content of 5–60%, a weight average polymerization degree Pw of no greater than 180, and a maximum peak molecular weight of no more than 20,000 in the molecular weight distribution of the THF soluble portion as measured by gel permeation chromatography (hereunder, GPC).

According to the present invention, this toner resin may be produced by suspension polymerization of a mixture containing an aromatic vinyl component, a (meth)acrylic compound component and a polyfunctional compound component under conditions which satisfy the following relational expressions (I) and (II).

$$P - P0 \geq 0.3 \quad \text{(I)}$$

$$T \geq 100 \quad \text{(II)}$$

In the above relational expressions, P is the reaction pressure (kg/cm$^2$), P0 is the saturated water vapor pressure (kg/cm$^2$) at the reaction temperature T (° C.), and T is the reaction temperature (° C.).

BEST MODE FOR CARRYING OUT THE INVENTION

The toner resin of the present invention comprises a polymer obtained by polymerizing (a) an aromatic vinyl component, (b) a (meth)acrylic compound component and (c) a polyfunctional compound component.

Examples of the aromatic vinyl component (a) which may be used according to the invention include styrene, o-methylstyrene, m-methylstyrene, p-methylstyrene, p-methoxystyrene, p-phenylstyrene, p-chlorostyrene, 3,4-dichlorostyrene, p-ethylstyrene, 2,4-dimethylstyrene, p-n-butylstyrene, p-t-butylstyrene, p-n-hexylstyrene, p-n-octylstyrene, p-n-nonylstyrene, p-n-decylstyrene, p-n-dodecylstyrene and α-methylstyrene, of which styrene is particularly preferred. These aromatic vinyl compounds may be used either alone or in combinations of 2 or more.

Examples of the (meth)acrylic compound component (b) which may be used according to the invention include acrylic acid and methacrylic acid (for simplicity's sake these are hereunder referred to collectively as (meth)acrylic acid), ethyl (meth)acrylate, methyl (meth)acrylate, n-butyl (meth) acrylate, isobutyl (meth)acrylate, propyl (meth)acrylate, 2-ethylhexyl (meth)acrylate, stearyl (meth)acrylate, lauryl (meth)acrylate, 2-ethoxyethyl (meth)acrylate, 2-methoxyethyl (meth)acrylate, 2-butoxyethyl (meth) acrylate, glycidyl methacrylate, cyclohexyl methacrylate, diethylaminoethyl methacrylate and dimethylaminoethyl methacrylate, of which methacrylic acid, methyl methacrylate and n-butyl (meth)acrylate are particularly preferred. These (meth)acrylic compounds may be used either alone or in combinations of 2 or more.

The polyfunctional compound component (c) used according to the invention is a component which provides crosslinking in the resulting resin, and it is typically a compound with 2 or more ethylenic unsaturated groups per molecule. Examples of such compounds include aromatic divinylic compounds such as divinylbenzene and divinylnaphthalene, as well as ethyleneglycol di(meth)acrylate, triethyleneglycol di(meth)acrylate, tetraethyleneglycol di(meth)acrylate, polyethyleneglycol di(meth)acrylate, dipropyleneglycol di(meth)acrylate, 1,3-butyleneglycol di(meth)acrylate and di(meth)acrylates of bisphenol A derivatives, of which divinylbenzene, 1,3-butyleneglycol dimethacrylate and ethyleneglycol dimethacrylate are particularly preferred. These polyfunctional compounds may be used either alone or in combinations of 2 or more.

The amounts of the above-mentioned aromatic vinyl component (a) and (meth)acrylic compound component (b) units in the toner resin are not particularly restricted so long as they are such that the Tg of the resin is between 50° C. and 70° C., but the aromatic vinyl component (a) unit must be present in an amount of 50 wt % or more, and preferably 52 wt % or more, of the total amount when combined with the (meth)acrylic compound component (b) unit. This is because a content of the aromatic vinyl component (a) unit of less than 50 wt % results in a reduced humidity resistance of the toner.

The contents of the above-mentioned aromatic vinyl component (a) unit in the THF insoluble portion and the THF soluble portion of the toner resin are preferably equal. More preferably, the contents of the aromatic vinyl component (a) unit and the compositional ratios of the aromatic vinyl component (a) unit, (meth)acrylic compound component (b) unit and polyfunctional compound component (c) unit in the THF insoluble and THF soluble portions of the resin are also equal. This is in order to increase the miscibility of the THF insoluble portion and THF soluble portion during mixing of the toner, and thus obtain an effect of greater image stability.

The amount of the above-mentioned polyfunctional compound component (c) unit is preferably 0.4–5 wt %, and more preferably 0.5–4.5 wt %, with respect to the total amount of the aforementioned aromatic vinyl component (a) unit and (meth)acrylic compound component (b) unit. When the amount is less than 0.4 wt % there is less THF insoluble portion in the resin, tending to result in a reduced non-offsetting property of the toner, and when it exceeds 5 wt % there is more THF insoluble portion, tending to result in an inferior fixing property of the toner.

Thus, toner resin of the present invention with the construction described above has an THF insoluble portion of 5–60%, preferably 10–50% and more preferably 10–40%, a weight average polymerization degree Pw of 180 or less, preferably 160 or less and more preferably 100 or less, and a maximum peak molecular weight of no more than 20,000, preferably no more than 18,000, and more preferably no more than 10,000, in the molecular weight distribution of the THF soluble portion as measured by GPC.

This is due to the following reasons:

(1) Toner made of resin with a THF insoluble portion of less than 5% has an inferior non-offsetting property, and toner made of resin with a THF insoluble portion of greater than 60% has an inferior fixing property;

(2) Toner made of resin whose THF soluble portion has a weight average polymerization degree Pw exceeding 180 has an inferior fixing property;

(3) Toner made of resin with a maximum peak molecular weight exceeding 20,000 in the molecular weight distribution of the THF soluble portion as measured by GPC has a reduced fixing property.

The weight average polymerization degree Pw of the toner resin of the present invention is most important from the standpoint of the fixing property of the toner, and the weight average polymerization degree Pw must be 180 or lower. This is because a weight average polymerization degree Pw of greater than 180 results in a reduced fixing property, and thus 160 or lower is even more preferred. According to the present invention, the weight average polymerization degree Pw is the weight average polymerization degree of the linear portion in the case of a 100% reaction rate between the above-mentioned components (a) to (c), and it may be calculated by the equation provided below.

According to the invention, improvement in the fixing property and non-offsetting property is preferably achieved by selection of the value of the weight average polymerization degree Pw with respect to the THF insoluble portion. That is, the weight average polymerization degree Pw is preferably selected so that when the THF insoluble portion is less than 40% the relational expression $Pw \leq -3.25x+180$ is satisfied, and when the THF insoluble portion is 40% or greater the relational expression $Pw \leq -0.25x +60$ is satisfied (where x represents the THF insoluble portion (%)).

This is because when the THF insoluble portion is less than 40%, the relatively low softening temperature of the resin gives a satisfactory fixing property to the toner, but the non-offsetting property is inferior, while a THF insoluble portion of greater than 40% results in a dramatic increase in the softening temperature of the resin, and thus a reduced fixing property.

Thus, in order to prevent reduction in the fixing property of the toner with increased amount of THF insoluble portion, it is necessary to lower the value of the weight average polymerization degree Pw when the amount of the THF insoluble portion is greater.

Furthermore, according to the invention, the glass transition temperature Tg of the toner resin is preferably 50–70° C., more preferably 53–67° C., and even more preferably 55–65° C. This is because toner made of resin with a Tg of less than 50° C. leads to poorer images due to fusing of the toner during the electrification process and contamination of the developing roll when the toner adheres thereto, while on the other hand toner made of resin with a Tg exceeding 70° C. tends to have a lower fixing property.

The softening temperature of the resin is in a range of preferably 110–190° C., more preferably 115–185° C., and even more preferably 120–155° C. This is because toner made of resin with a softening temperature of less than 110° C., though having an improved fixing property, also tends to have drastically lower cohesiveness of the resin, resulting in failure to obtain a sufficient non-offsetting property, while on the other hand toner made of resin with a softening temperature exceeding 190° C., though having an improved non-offsetting property, tends to have a drastically reduced fixing property.

The acid value is in a range of preferably 0.1–20 mgKOH/g, and more preferably 0.1–19 mgKOH/g. This is because the production of resins with acid values of less than 0.1 mgKOH/g is very troublesome, while toner made of resin with an acid value exceeding 20 mgKOH/g tends to have lower humidity resistance.

In addition, the residual monomer content of the toner resin of the present invention is preferably no more than 1000 ppm, more preferably no more than 600 ppm, even more preferably no more than 200 ppm, and most preferably no more than 100 ppm. This is because toner made of resin with a residual monomer content exceeding 1000 ppm tends to generate odors during the melting and mixing for production of the toner and under the heat of copying, while the image stability also tends to be lower.

The secondary cohesion of the resin on a 16-mesh net is preferably no more than 5 wt %, and more preferably no more than 4 wt %. This is because toner made of resin whose secondary cohesion on a 16-mesh net exceeds 5 wt % has a tendency to create fogging on images.

Furthermore, according to the present invention, the toner resin preferably has a storage elastic modulus (G') of 4,000 or greater, a loss elastic modulus (G") of 4,000 or greater, and a Tan$\delta$ (value of the loss elastic modulus divided by the storage elastic modulus (G"/G')) of less than 1, from the viewpoint of the fixing property and non-offsetting property of the toner.

Toner made of resin with a storage elastic modulus of less than 4,000 has an inferior non-offsetting property, and thus the storage elastic modulus is particularly preferred to be 5,000 or greater. Also, since toner made of resin with a loss elastic modulus of less than 4,000 has an inferior fixing property, the loss elastic modulus is particularly preferred to be 4,500 or greater. Furthermore, since toner made of resin with a Tan$\delta$ exceeding 1.0 has an inferior fixing property, the Tan$\delta$ is particularly preferred to be 0.9 or lower.

The values of the storage elastic modulus (G'), loss elastic modulus (G") and Tan$\delta$ according to the invention are the values obtained by measuring the viscoelasticity using a 25 mm-diameter plane-parallel plate with a Rheometrix RDA700 rheometer, at a temperature of 175–177° C., a frequency of 1 Hz and a strain of 0.28%.

Toner resin according to the invention with the properties described above can be produced by suspension polymerization. Other methods of producing the toner resin, in addition to suspension polymerization, include solution polymerization, emulsion polymerization and bulk polymerization. However, solution polymerization involves complicated treatment for removal of the solvent, while odors are generated by the residual solvent and the image stability is impaired, with emulsion polymerization the residual emulsifying agent remaining in large quantities in the resulting resin lowers the humidity resistance, and bulk polymerization involves complicated control of the heat generated by the polymerization, which is an industrial disadvantage, and hence it cannot be used to produce the type of toner resin which is the object of the present invention.

In the process for producing toner resin according to the invention, the above-mentioned polymerization components (a) to (c), a polymerization initiator, an emulsifying agent, an emulsifying aid and deionized water are loaded into a reaction container for suspension polymerization. For the suspension polymerization, it is important that the relationship between the saturated water vapor pressure P$\theta$ (kg/cm$^2$) at the reaction temperature T (° C.) and the reaction pressure P (kg/cm$^2$) be controlled so as to satisfy the following relational expressions (I) and (II).

$$P-P\theta \geq 0.3 \quad (I)$$

$$T \geq 100 \quad (II)$$

With regard to the above relational expression (I), the polymer rises to the surface of the reaction solution during suspension polymerization if P−P$\theta$ is less than 0.3 kg/cm$^2$, generating a "floating polymer", and secondary cohesion becomes possible on a 16-mesh net (secondary cohesion product of the polymer which fails to pass through a 16-mesh sieve). Toner made of resin containing such a secondary cohesion polymer results in increased fogging on images, and lower image stability. The preferred range for P−P$\theta$ is P−P$\theta \geq 0.5$.

The reaction temperature T in the relational expression (II) is 100° C. or higher, and preferably 105° C. or higher. If the reaction temperature is lower than 100° C. the molecular weight of the polymer increases and the fixing property of the toner is poorer.

In suspension polymerization carried out according to the process of the present invention, the temperature elevation time from room temperature until the reaction temperature is reached is preferably in the range of 20 to 90 minutes. This is because less than 20 minutes does not allow sufficient crosslinking of the resin, and if the temperature is elevated for longer than 90 minutes it becomes impossible to lower the molecular weight of the resin.

The polymerization initiator to be used for the suspension polymerization is preferably a peroxide polymerization initiator. The peroxide polymerization initiator which is used preferably has a half-life of 10 hours in a range of 60–110° C.

Examples of such peroxide polymerization initiators which may be mentioned include lauryl peroxide (62° C.), cumeperoxyoctoate (68° C.), benzoyl peroxide (74° C.), t-butyl peroxy(2-ethylhexanoate) (72.5° C.), m-toluoyl peroxide (73° C.), t-butyl peroxyisobutylate (78° C.), 1,1-bis-(t-butylperoxy)-3,3,5-trimethylcyclohexane (90° C.), t-butyl peroxylaureate (96° C.), cyclohexanone peroxide (97° C.), t-butyl peroxyisopropylcarbonate (98° C.), t-butyl peroxyacetate (102° C.), t-butyl peroxybenzoate (104° C.), di-t-butyl peroxyisophthalate (107° C.), etc. (the temperatures given above in parentheses are the temperatures at which the half-lives are 10 hours), and particularly preferred for use are lauryl peroxide, benzoyl peroxide, t-butyl peroxyisopropylcarbonate and t-butyl peroxybenzoate.

These polymerization initiators may be used alone or in combinations of 2 or more, but according to the present invention it is particularly preferred to use a combination of 2 polymerization initiators with different half-life temperatures, in order to reduce the amount of residual monomer and increase the glass transition temperature of the resin.

Although there are no particular restrictions on the amount of the polymerization initiator used, it is preferably in the range of 1.5–10 wt %, and more preferably in the range of 1.5–9 wt %, with respect to the total amount of the polymerization components (a) to (c).

A dispersant which is commonly used for suspension polymerization may also be used for the suspension polymerization according to the process of the invention, and examples of such dispersants include polyvinyl alcohol, sodium polyacrylate-based dispersants, polyether-based dispersants, and the like. A dispersing aid which is commonly used for suspension polymerization may also be used, examples of which include sodium sulfate, sodium carbonate, calcium carbonate, manganese sulfate, hydrogen peroxide water, boric acid, and the like.

For the suspension polymerization, deionized water may be used as the dispersing medium for the polymerization components, and the deionized water is preferably used in an amount in the range of 1.2–2.5, and more preferably in the range of 1.4–2.3, in terms of weight ratio with respect to the polymerization components.

According to the process of the present invention, the suspension polymerization described above is preferably followed by alkali treatment at a temperature of 85° C. or higher, and especially 88° C. or higher. This is effective to decrease the amount of benzoic acid produced from the polymerization initiator, and to provide satisfactory electrification stability of the resin. The alkali used may be a hydroxide of an alkali metal such as lithium, sodium, potassium or rubidium, with sodium hydroxide being particularly preferred. The amount of the alkali to be used is preferably in the range of 0.1–2 wt %, and especially 0.3–1.5 wt %, with respect to the total amount of the aromatic vinyl component (a) and the (meth)acrylic compound component (b).

According to the process of the present invention, following the suspension polymerization described above, distillation may be performed at a temperature of 100° C. or higher either before or during the alkali treatment, to distill the residual monomer out of the system together with the deionized water. The amount distilled out by the distillation is in the range of 5–30 wt %, and preferably 10–25 wt % of the amount of deionized water used for the suspension polymerization.

After the alkali-treated polymer beads had been sufficiently washed with deionized water, it is dewatered and dried.

Since the polymerization in the method of the invention having the construction described above is a single-stage polymerization, the amount of residual monomer in the resulting resin is as low as about 1000 ppm or less, and thus it is possible to obtain toner with no generation of odors during the melting and mixing for production of the toner and under the heat of copying, and with excellent image stability.

The present invention will now be more fully explained by way of the following examples and comparative examples. The following methods were used for evaluation of the performance in the examples. The term "parts" in the examples refers to "parts by weight".

(1) THF Soluble Portion (%)

To obtain this value, 0.5 g of the resin was placed in 50 ml of THF and heated at 70° C. for 3 hours to dissolution, filtered with a glass filter covered with Celite (#545, product of Johns-Manville Sales Co.) and sufficiently dried in a vacuum air drier at 80° C., and this weight was divided by the initial weight.

(2) Weight Average Polymerization Degree Pw

The weight average polymerization degree Pw was obtained by calculation using the following equation (III).

$$Pw = \frac{1}{\rho Pc} \quad \text{(III)}$$

where Pc is the reaction rate of the components (a) to (c), and p is the value calculated from the following equation (IV) where A is the part by mole of component (a), B is the part by mole of component (b) and C is the part by mole of component (c).

$$\rho = \frac{\text{number of functional groups} \times C}{A + B + \text{number of functional groups} \times C} \quad \text{(IV)}$$

(3) Measurement of Maximum Peak Molecular Weight in the Molecular Weight Distribution as Measured by GPC Using a GPC HCL-8020, product of Toso, KK., the molecular weights were calculated based on the relationship between the counted numerical value and a calibration curve prepared from a monodispersed polystyrene standard sample, and the molecular weight distribution was determined, defining the maximum peak thereof as the molecular weight.

The sample used was obtained by dissolving and extracting the resin with a solvent (THF).

(4) Tg (° C.)

The Tg was defined as the point of contact between a base line and the tangent of the endothermic curve near the Tg measured with a temperature elevating rate of 10° C./min using a differential scanning calorimeter, product of Shimazu Seisakusho, KK.

(5) Softening Temperature (° C.)

The softening temperature (° C.) was defined as the temperature at which run-off of half of the sample occurred, using a flow tester (CFT-500), product of Shimazu Seisakusho, KK., with a 1.0 mmΦ×10 mmL nozzle, a load of 30 kgf, a heating rate of 3° C./min and 1.0 g of sample.

(6) Acid Value (mgKOH/g)

The resin was heated to dissolution in toluene and then cooled and titrated with a KOH solution.

(7) Secondary Cohesion (%) on 16-mesh Net

To obtain this value, a 50 g resin sample was placed on a 16-mesh sieve and gently shaken for about 4 hours, and the weight of the polymer remaining on the net of the 16-mesh sieve was divided by the initial weight.

(8) The storage elastic modulus (G'), loss elastic modulus (G") and Tanδ were measured according to the method described above.

(9) Toner Fixing Property, Non-offsetting Property and Image Stability

The fixing property, non-offsetting property and image stability were evaluated using a copying machine with a fixing speed of 250 mm/sec and a freely adjustable fixing temperature.

(a) Fixing Property

With an initial concentration of 1.2–1.3, the ratio of the concentration after rubbing with a sand eraser with respect to the initial concentration was calculated, and the temperature at which this ratio exceeded 85% was recorded as the fixing temperature.

○—excellent (fixing temperature <170° C.)

Δ—somewhat poor (fixing temperature 170–180° C.)

x—poor (fixing temperature≧181° C.)

(b) Non-offsetting Property

Evaluated based on the offset-generating temperature.

○—excellent (offset-generating temperature≧210° C.)

Δ—somewhat poor (200° C.≦offset-generating temperature<210° C.)

x–poor (offset-generating temperature<200° C.)

(c) Image Stability

Evaluated upon printing 20,000 sheets with the copying machines mentioned above, and visually examining the image quality.

○—excellent

Δ—some fogging x—considerable fogging

(10) Blocking Resistance of Toner

Five grams of toner was placed in a 50 ml glass sample bottle and allowed to stand for 70 hours in a hot air drier at 50° C., after which it was cooled to room temperature and the degree of cohesion was visually examined.

○—excellent (toner dispersed evenly when sample was turned upside down and tapped)

Δ—somewhat poor (toner dispersed evenly when sample was turned upside down and tapped 3 times)

x—poor (toner cohered without dispersion even when sample was turned upside down and strongly shaken)

EXAMPLE 1

A thorough mixture of 220 parts of deionized water, 0.15 part of polyvinyl alcohol (88% saponification) and 0.03 part of hydrogen peroxide was charged into a reaction container equipped with a distillation column and a stirrer. Styrene, n-butyl acrylate and 1,3-butyleneglycol dimethacrylate were then added in the amounts listed in Table 1, and the contents were agitated at a rotating speed of 350 rpm.

A polymerization initiator was then added in the amounts listed in Table 1, after which the agitation was continued for about one hour, and the reaction container was sealed to form a closed reaction system and temperature elevation was begun. After beginning elevation of the temperature, the internal pressure and temperature of the reaction system were gradually raised, and after about 45 minutes of controlling the reaction pressure in accordance with the temperature, the internal temperature of the reaction system reached the reaction temperatures listed in Table 1. This condition was maintained for about 4 hours and 30 minutes, keeping the reaction temperature constant while controlling the reaction pressure to the pressures listed in Table 1.

The internal temperature of the reaction system was then lowered to 90° C. and the pressure in the reaction container brought to normal pressure, the agitation rotating speed was set to 400 rpm and heating was resumed until the internal temperature of the reaction system reached 100° C., and the mixture of deionized water and residual monomer which volatilized from the reaction system were distilled out. When about 2 hours had passed from the start of distillation, and the amount of distilled liquid reached 44 parts, the temperature of the reaction system was lowered and kept at 90° C., and 0.5 part of sodium hydroxide was added. After about 60 minutes had passed from the addition of the sodium hydroxide, the reaction system was cooled to room temperature and the rotating speed was lowered to 100 rpm.

The resin beads were then taken out of the reaction container and thoroughly washed with deionized water, after which the beads were dewatered and dried for about 48 hours in a drier kept at 50° C., to obtain resins R-1 to R-12. The data on the properties of the obtained resins R-1 to R-12 are shown in Table 2. Each of the resins R-1 to R-12 had an equal content of component (a) and an equal ratio of the components in both the THF soluble portion and the THF insoluble portion, which was the same as the polymerization composition.

With 91 parts of each of the above-mentioned resins R-1 to R-12 there were thoroughly mixed 5 parts of carbon black (#40, product of Mitsubishi Chemicals, KK.), 4 parts of polypropylene wax (550P, product of Sanyo Chemicals, KK.) and 1 part of a negative electrifying charge adjuster (S-34, product of Orient Chemical, KK.), and then kneading was performed for about 30 minutes while using an internal mixer (product of Kurimoto Steel Works, KK.) to control the resin temperature during kneading to be 20° C. higher than the softening temperature. The resulting toner lump was first coarsely crushed, and then finely crushed using a jet mill, after which a sorting machine was used to adjust the grain size of the toner, to obtain toners T-1 to T-12 with grain sizes within 5–20 μm. The results of evaluation of these toners T-1 to T-12 are listed in Table 3.

As may clearly be seen from Table 3, when the resins R-1 to R-12 were used as toners, excellent fixing properties, non-offsetting properties, blocking resistances and image stabilities were achieved.

TABLE 1

| | Polymerization composition | | | | | Polymerization conditions | | |
| --- | --- | --- | --- | --- | --- | --- | --- | --- |
| | | | | Polymerization initiator | | | Saturated | |
| | | n-butyl | | | | Reaction | water vapor | Reaction |
| Resin | Styrene (parts) | acrylate (parts) | BDMA (parts) | BPO (parts) | PZ (parts) | temp. (° C.) | pressure Pθ (kg/cm²) | pressure P (kg/cm²) |
| R-1 | 85 | 15 | 2.00 | 6 | 0.5 | 130 | 2.8 | 3.1 |
| R-2 | 85 | 15 | 2.15 | 6 | 0.5 | 130 | 2.8 | 3.3 |
| R-3 | 85 | 15 | 2.4 | 6 | 0.5 | 130 | 2.8 | 3.6 |
| R-4 | 85 | 15 | 2.4 | 6 | 0.5 | 130 | 2.8 | 4.0 |
| R-5 | 84 | 16 | 2.9 | 6 | 0.5 | 130 | 2.8 | 6.0 |
| R-6 | 81 | 19 | 2.8 | 6 | 0.5 | 130 | 2.8 | 8.0 |
| R-7 | 85 | 15 | 1.7 | 4 | 0.5 | 130 | 2.8 | 10.0 |
| R-8 | 85 | 15 | 2.8 | 6 | 0.8 | 150 | 4.9 | 5.9 |
| R-9 | 86 | 14 | 2.8 | 6 | 0.8 | 160 | 6.3 | 7.3 |
| R-10 | 85 | 15 | 2.4 | 6 | 0.8 | 115 | 1.7 | 2.7 |
| R-11 | 81 | 19 | 1.2 | 2 | 0.5 | 130 | 1.0 | 2.0 |
| R-12 | 81 | 19 | 1.2 | 3 | 0.5 | 130 | 1.2 | 2.3 |

Abbreviations
BDMA: 1,3-butyleneglycol dimethacrylate
BPO: benzoyl peroxide
PZ: t-butyl peroxybenzoate

TABLE 2

Resin properties

| Resin | THF insoluble portion (%) | Weight average polymerization degree Pw | Molecular weight of maximum peak in molecular weight distribution | Tg (° C.) | Softening temp. (° C.) | Acid value (mgKOH/g) | Secondary cohesion on 16-mesh net (%) | Residual monomer (ppm) | Viscoelasticity Storage elastic modulus (G') (kg/cm²) | Loss elastic modulus (G") (kg/cm²) | Tanδ (G"/G') |
|---|---|---|---|---|---|---|---|---|---|---|---|
| R-1 | 5.0 | 53.8 | 8,500 | 58 | 110 | 0.6 | 5 | 140 | 4050 | 4000 | 0.99 |
| R-2 | 10.0 | 50.2 | 8,300 | 60 | 120 | 0.7 | 4 | 120 | 4100 | 4000 | 0.98 |
| R-3 | 26.0 | 45.1 | 8,100 | 62 | 140 | 0.6 | 2 | 80 | 15000 | 7500 | 0.50 |
| R-4 | 26.8 | 45.1 | 8,200 | 62 | 140 | 0.5 | 0.01 | 80 | 15100 | 7550 | 0.50 |
| R-5 | 50.0 | 37.4 | 8,100 | 70 | 185 | 0.1 | 0.01 | 40 | 32500 | 12000 | 0.37 |
| R-6 | 55.0 | 38.5 | 8,000 | 64 | 180 | 0.1 | 0.01 | 60 | 25000 | 11000 | 0.44 |
| R-7 | 18.0 | 63.2 | 11,000 | 67 | 143 | 0.4 | 0.01 | 320 | 6700 | 6500 | 0.98 |
| R-8 | 29.0 | 38.8 | 6,500 | 53 | 148 | 0.8 | 0.01 | 90 | 14800 | 7200 | 0.49 |
| R-9 | 17.0 | 38.7 | 4,000 | 50 | 130 | 0.9 | 0.01 | 100 | 5100 | 4500 | 0.88 |
| R-10 | 35.0 | 45.1 | 10,500 | 64 | 151 | 1.1 | 0.01 | 95 | 21700 | 10000 | 0.46 |
| R-11 | 25.0 | 88.5 | 20,000 | 69 | 190 | 0.2 | 0.01 | 490 | 28500 | 14250 | 0.50 |
| R-12 | 21.0 | 88.5 | 17,900 | 67 | 185 | 0.2 | 0.01 | 440 | 15200 | 10640 | 0.70 |

TABLE 3

| Toner | Fixing property | Non-offsetting property | Blocking resistance | Image stability |
|---|---|---|---|---|
| T-1 | ○ | Δ | ○ | Δ |
| T-2 | ○ | ○ | ○ | ○ |
| T-3 | ○ | ○ | ○ | ○ |
| T-4 | ○ | ○ | ○ | ○ |
| T-5 | ○ | ○ | ○ | ○ |
| T-6 | ○ | ○ | ○ | ○ |
| T-7 | ○ | ○ | ○ | ○ |
| T-8 | ○ | ○ | ○ | ○ |
| T-9 | ○ | ○ | Δ | ○ |
| T-10 | ○ | ○ | ○ | ○ |
| T-11 | Δ | ○ | ○ | ○ |
| T-12 | ○ | ○ | ○ | ○ |

EXAMPLE 2

The same procedure was followed as in Example 1, except that the polymerization composition and polymerization conditions were as listed in Table 4, to obtain resins R-13 to R-17. The data for the properties of resins R-13 to R-17 are given in Table 5. Each of the resins R-13 to R-17 had an equal content of component (a) and an equal ratio of the components in both the THF soluble portion and the THF insoluble portion, which was the same as the polymerization composition.

The above-mentioned resins R-13 to R-17 were then used to obtain toners T-13 to T-17 by the same procedure as in Example 1. The resulting toners T-13 to T-17 were evaluated in the same manner as in Example 1, except that a copier with a fixing speed of 200 mm/sec was used. The results are given in Table 6.

As is clear from Table 6, when the resins R-13 to R-17 were used as toners, excellent fixing properties, non-offsetting properties, blocking resistances and image stabilities were achieved.

TABLE 4

| | Polymerization composition | | | | | | Polymerization conditions | | |
|---|---|---|---|---|---|---|---|---|---|
| | | n-butyl | Methacrylic | | Polymerization initiator | | Reaction | Saturated | Reaction |
| Resin | Styrene (parts) | acrylate (parts) | acid (parts) | DVB (parts) | BPO (parts) | PZ (parts) | temp. (° C.) | water vapor pressure Pθ (kg/cm²) | pressure P (kg/cm²) |
| R-13 | 81.0 | 17.5 | 1.5 | 1.10 | 7 | 0.5 | 135 | 3.2 | 3.5 |
| R-14 | 81.0 | 16.1 | 2.9 | 1.10 | 7 | 0.5 | 135 | 3.2 | 3.5 |
| R-15 | 81.0 | 15.9 | 3.1 | 1.10 | 7 | 0.5 | 135 | 3.2 | 3.5 |
| R-16 | 81.0 | 17.5 | 1.5 | 0.4 | 6 | 0.5 | 130 | 2.8 | 4.0 |
| R-17 | 81.0 | 17.5 | 1.5 | 0.5 | 6 | 0.5 | 130 | 2.8 | 4.0 |

Abbreviations
DVB: divinylbenzene

TABLE 5

| | | | Molecular | | | | | | Viscoelasticity | | |
|---|---|---|---|---|---|---|---|---|---|---|---|
| Resin | THF insoluble portion (%) | Weight average polymerization degree Pw | weight of maximum peak in molecular weight distribution | Tg (°C.) | Softening temp. (°C.) | Acid value (mgKOH/g) | Secondary cohesion on 16-mesh net (%) | Residual monomer (ppm) | Storage elastic modulus (G') (kg/cm$^2$) | Loss elastic modulus (G") (kg/cm$^2$) | Tanδ (G"/G') |
| R-13 | 35.0 | 56.2 | 7,200 | 59.0 | 156 | 10.0 | 4.8 | 70 | 18000 | 8460 | 0.47 |
| R-14 | 34.0 | 66.5 | 7,100 | 62.0 | 164 | 19.0 | 4.9 | 68 | 17800 | 8300 | 0.47 |
| R-15 | 35.0 | 56.5 | 7,000 | 64.0 | 167 | 20.0 | 5.0 | 71 | 18500 | 8500 | 0.46 |
| R-16 | 5.5 | 153.3 | 8,100 | 60.0 | 110 | 9.8 | 0.01 | 140 | 4082 | 4000 | 0.98 |
| R-17 | 12.0 | 123.5 | 18,000 | 58.0 | 120 | 10.0 | 0.01 | 480 | 5200 | 4900 | 0.96 |

TABLE 6

| Toner | Fixing property | Non-offsetting property | Blocking resistance | Image stability |
|---|---|---|---|---|
| T-13 | ○ | ○ | ○ | Δ |
| T-14 | ○ | ○ | ○ | Δ |
| T-15 | ○ | ○ | ○ | Δ |
| T-16 | ○ | Δ | ○ | ○ |
| T-17 | ○ | ○ | ○ | ○ |

COMPARATIVE EXAMPLE 1

The same procedure was followed as in Example 1, except that the polymerization composition and polymerization conditions were as listed in Table 7, to obtain resins R-18 to R-25. The data for the properties of resins R-18 to R-25 are given in Table 8.

The above-mentioned resins R-18 to R-25 were then used to obtain toners T-18 to T-25 by the same procedure as in Example 1. The resulting toners T-18 to T-25 were evaluated in the same manner as in Example 1. The results are given in Table 9.

Resin R-18 had large amount of secondary cohesion on a 16-mesh net, and thus resulted in a toner with poor image stability. Resin R-19 had a high Tg, molecular weight, THF insoluble portion and softening temperature, and thus resulted in toner with an inferior fixing property. Resin R-20 had a low softening temperature and THF insoluble portion, and thus resulted in toner with an inferior non-offsetting property. Resin R-21 had a low Tg and thus resulted in toner with poor blocking resistance. Resin R-22 had a high Tg and thus resulted in toner with a poor fixing property. Resin R-23 had a low THF insoluble portion and a high weight average polymerization degree Pw, and thus resulted in poor non-offsetting and fixing properties. Resin R-24, which had a high molecular weight, and resin R-25, which had a high softening temperature and THF insoluble portion, resulted in a poor fixing property.

TABLE 7

| | Polymerization composition | | | | | Polymerization conditions | | |
|---|---|---|---|---|---|---|---|---|
| | | | | Polymerization initiator | | | Saturated | |
| | | n-butyl | | | | Reaction | water vapor | Reaction |
| Resin | Styrene (parts) | acrylate (parts) | BDMA (parts) | BPO (parts) | PZ (parts) | temp. (°C.) | pressure Pθ (kg/cm$^2$) | pressure P (kg/cm$^2$) |
| R-18 | 85 | 15 | 2.0 | 6 | 0.5 | 130 | 2.8 | 2.8 |
| R-19 | 85 | 15 | 1.2 | 3 | 0.5 | 90 | 0.7 | 2.0 |
| R-20 | 85 | 16 | 1.4 | 6 | 0.5 | 130 | 2.8 | 4.0 |
| R-21 | 80 | 20 | 2.4 | 6 | 0.5 | 130 | 2.8 | 4.0 |
| R-22 | 95 | 5 | 2.4 | 6 | 0.5 | 130 | 2.8 | 4.0 |
| R-23 | 80 | 20 | 0.25 | 2 | 0.5 | 130 | 2.8 | 4.0 |
| R-24 | 80 | 20 | 1.0 | 1 | 0.1 | 130 | 2.8 | 4.0 |
| R-25 | 85 | 15 | 6.0 | 6 | 0.5 | 150 | 2.8 | 4.0 |

Abbreviations
BDMA: 1,3-butyleneglycol dimethacrylate
BPO: benzoyl peroxide
PZ: t-butyl peroxybenzoate

TABLE 8

| | Resin properties | | | | | | | | | | |
|---|---|---|---|---|---|---|---|---|---|---|---|
| | | | Molecular | | | | | | Viscoelasticity | | |
| Resin | THF insoluble portion (%) | Weight average polymerization degree Pw | weight of maximum peak in molecular weight distribution | Tg (°C.) | Softening temp. (°C.) | Acid value (mgKOH/g) | Secondary cohesion on 16-mesh net (%) | Residual monomer (ppm) | Storage elastic modulus (G') (kg/cm²) | Loss elastic modulus (G") (kg/cm²) | Tanδ (G"/G') |
| R-18 | 5.0 | 53.9 | 8,500 | 57 | 113 | 0.7 | 8 | 1100 | 4100 | 4000 | 0.98 |
| R-19 | 65.0 | 89.1 | 28,000 | 75 | 210 | 0.4 | 0.01 | 85 | 35100 | 11900 | 0.34 |
| R-20 | 1.2 | 76.5 | 8,500 | 55 | 105 | 0.5 | 0.01 | 220 | 910 | 1028 | 1.13 |
| R-21 | 26.0 | 44.6 | 8,300 | 45 | 130 | 0.6 | 0.01 | 85 | 15000 | 7500 | 0.50 |
| R-22 | 27.0 | 45.9 | 8,500 | 75 | 155 | 0.6 | 0.01 | 95 | 15100 | 7600 | 0.50 |
| R-23 | 2.0 | 419.8 | 18,000 | 61 | 130 | 0.1 | 0.01 | 820 | 1600 | 1760 | 1.10 |
| R-24 | 29.0 | 105.7 | 30,000 | 62 | 158 | 0.1 | 0.01 | 1400 | 32600 | 15970 | 0.49 |
| R-25 | 65.3 | 18.6 | 8,500 | 53 | 200 | 0.6 | 0.01 | 45 | 35000 | 11800 | 0.34 |

TABLE 9

| Toner | Fixing property | Non-offsetting property | Blocking resistance | Image stability |
|---|---|---|---|---|
| T-18 | ○ | Δ | ○ | x |
| T-19 | x | ○ | ○ | ○ |
| T-20 | ○ | x | ○ | ○ |
| T-21 | ○ | ○ | x | ○ |
| T-22 | x | ○ | ○ | ○ |
| T-23 | x | x | ○ | ○ |
| T-24 | x | ○ | ○ | ○ |
| T-25 | x | ○ | ○ | ○ |

COMPARATIVE EXAMPLE 2

The same procedure was followed as in Example 2, except that the polymerization composition and polymerization conditions were as listed in Table 10, to obtain resins R-26 and R-27. The data for the properties of resins R-26 and R-27 are given in Table 11.

The above-mentioned resins R-26 and R-27 were then used to obtain toners T-26 and T-27 by the same procedure as in Example 1. The resulting toners T-26 to T-27 were evaluated in the same manner as in Example 2. The results are given in Table 12.

Resin R-26 had a high acid value and was more susceptible to humidity, and thus resulted in a toner with poor image stability. Resin R-27 had less THF insoluble portion and a low softening temperature, and thus resulted in toner with a poor non-offsetting property.

TABLE 10

| | Polymerization composition | | | | | | Polymerization conditions | | |
|---|---|---|---|---|---|---|---|---|---|
| Resin | Styrene (parts) | n-butyl acrylate (parts) | Methacrylic acid (parts) | DVB (parts) | Polymerization initiator BPO (parts) | PZ (parts) | Reaction temp. (°C.) | Saturated water vapor pressure Pθ (kg/cm²) | Reaction pressure P (kg/cm²) |
| R-26 | 81 | 15.9 | 3.1 | 1.10 | 7 | 0.5 | 135 | 3.2 | 3.5 |
| R-27 | 81 | 17.5 | 1.5 | 0.3 | 6 | 0.5 | 130 | 2.8 | 4.0 |

Abbreviations
DVB: divinylbenzene

TABLE 11

| | Resin properties | | | | | | | | | | |
|---|---|---|---|---|---|---|---|---|---|---|---|
| | | | Molecular | | | | | | Viscoelasticity | | |
| Resin | THF insoluble portion (%) | Weight average polymerization degree Pw | weight of maximum peak in molecular weight distribution | Tg (°C.) | Softening temp. (°C.) | Acid value (mgKOH/g) | Secondary cohesion on 16-mesh net (%) | Residual monomer (ppm) | Storage elastic modulus (G') (kg/cm²) | Loss elastic modulus (G") (kg/cm²) | Tanδ (G"/G') |
| R-26 | 34.5 | 56.5 | 7,100 | 61.0 | 163 | 24.5 | 4.7 | 75 | 18000 | 8460 | 0.47 |
| R-27 | 2.1 | 205.7 | 8,000 | 60.0 | 105 | 2.1 | 0.01 | 210 | 1600 | 1740 | 1.1 |

TABLE 12

| Toner | Fixing property | Non-offsetting property | Blocking resistance | Image stability |
|---|---|---|---|---|
| T-26 | ○ | ○ | ○ | x |
| T-27 | ○ | x | ○ | ○ |

COMPARATIVE EXAMPLE 3

A mixture comprising 70 parts of styrene, 20 parts of n-butyl acrylate, 10 parts of α-methylstyrene and 8 parts of benzoyl peroxide was added dropwise to 200 parts of boiling toluene over a period of 5 hours, and the reaction mixture was kept at the boiling point for an additional 3 hours for polymerization. The mixture was then vacuum dried to remove the toluene and obtain a low molecular weight polymer. The aromatic vinyl content in the THF soluble portion of this low molecular weight polymer was 80 wt %.

Next, a uniform mixture comprising 70 parts of the above-mentioned low molecular weight polymer, 20 parts of styrene, 24 parts of n-butyl acrylate, 1 part of divinylbenzene and 4 parts of benzoyl peroxide was suspended and dispersed in 300 parts of water in which had been dissolved 0.8 part polyvinyl alcohol (88% saponification), and polymerization was conducted for 15 hours at a temperature of 80° C., to obtain a resin R-44 containing a THF insoluble portion. The resulting resin R-44 had a THF soluble portion of 33%, a weight average polymerization degree Pw of 101.7, and a maximum peak molecular weight of 8,000 in the molecular weight distribution.

The aromatic vinyl contents in the THF soluble portion and THF insoluble portion of resin R-44 were 76.4% and 42.4%, respectively.

This resin R-44 was then used to obtain toner T-44 following the same procedure as in Example 1. When this toner T-44 was evaluated in the same manner as in Example 1, it resulted in fogging in produced images, and thus was unusable.

INDUSTRIAL APPLICABILITY

The toner resin of the present invention which has the construction described above has an excellent fixing property, non-offsetting property, blocking resistance and image stability, and is thus very useful as a toner resin for printers, copying machines, facsimiles and the like which work by electrophotography or electrostatic printing.

In addition, since the toner resin of the present invention may be obtained by suspension polymerization under specific conditions, there is little residual monomer in the resin, and therefore it has the superior advantage of not generating odors during kneading when the toner is produced or when heated during copying.

We claim:

1. A toner resin consisting of a polymer which comprises (a) an aromatic vinyl unit, (b) a (meth)acrylic acid unit and/or (meth)acrylic ester unit (c) a polyfunctional compound unit, with a tetrahydrofuran insoluble portion content of 5–60%, a maximum peak molecular weight of no more than 20,000 in the molecular weight distribution of the tetrahydrofuran soluble portion as measured by gel permeation chromatography, and a weight average polymerization degree of 180 or lower.

2. The toner resin of claim 1 wherein the weight average polymerization degree Pw and the tetrahydrofuran insoluble portion x satisfy the following relational expressions:

$Pw \leq -3.25x + 180$ (x<40%)

$Pw \leq -0.25x + 60$ (x≥40%).

3. The toner resin of claim 1, wherein the aromatic vinyl component (a) unit is present in an amount of 50 wt % or more with respect to the total amount of the component (a) unit and the component (b) unit.

4. The toner resin of claim 1, wherein the polyfunctional compound component (c) unit is present in an amount of 0.4–5 wt % with respect to the total amount of the component (a) unit and the component (b) unit.

5. The toner resin of claim 1, which has a glass transition temperature of 50–70° C.

6. The toner resin of claim 1, which has a softening temperature of 110–190° C.

7. The toner resin of claim 1, which has an acid value of 0.1–20 mgKOH/g.

8. The toner resin of claim 1, wherein the amount of secondary cohesion on a 16-mesh net is no more than 5 wt %.

9. The toner resin of claim 1, which has a storage elastic modulus of at least 4,000, a loss elastic modulus of at least 4,000, and a Tanδ of less than 1.

10. The toner resin of claim 1, which has a residual monomer amount of no more than 100 ppm.

11. A process for producing toner resin which includes suspension polymerization of a mixture containing an aromatic vinyl component (a), an acrylic or methacrylic acid or ester component (b) and a polyfunctional compound component (c) under conditions which satisfy the following relational expressions (I) and (II)

$P - P\theta \geq 0.3$ (I)

$T \geq 100$ (II)

where P=reaction pressure (kg/cm$^2$)

Pθ=saturated water vapor pressure (kg/cm$^2$) at the reaction temperature T (° C.)

T=reaction temperature (° C.).

12. The process for producing toner resin as described in claim 11, wherein the aromatic vinyl component (a) is present in an amount of 50 wt % or more with respect to the total amount of the component (a) and the component (b).

13. The process for producing toner resin as described in claim 11, wherein the polyfunctional compound component (c) is present in an amount of 0.4–5 wt % with respect to the total amount of the component (a) and the component (b).

14. The process for producing toner resin as described in claim 11, wherein the temperature elevating time from room temperature to the reaction temperature is 20–90 minutes.

15. The process for producing toner resin as described in claim 11, wherein the polymerization initiator used is a peroxide polymerization initiator with a half-life of 10 hours in a range of 60–110° C.

16. The process for producing toner resin as described in claim 11, wherein the suspension polymerization is followed by alkali treatment at a temperature of at least 85° C.

17. The process for producing toner resin as described in claim 11, wherein the suspension polymerization is followed by distillation at a temperature of at least 100° C.

18. The process for producing toner resin as described in claim 11, wherein the suspension polymerization is carried out in a single stage.

* * * * *